No. 766,028. PATENTED JULY 26, 1904.
F. M. & G. FISHER.
LANTERN ATTACHMENT FOR VEHICLES.
APPLICATION FILED MAR. 1, 1904.
NO MODEL.
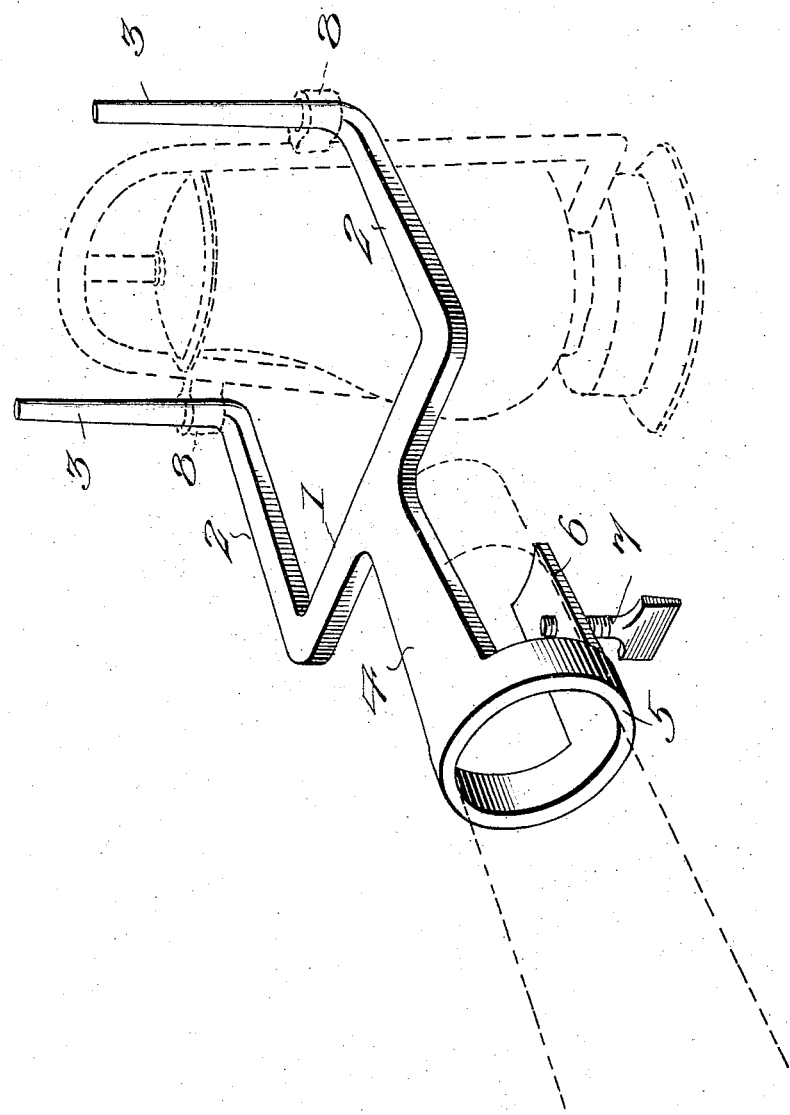
Witnesses
Wm. Koerth.
Chas. S. Hyer.
Inventors
Frank M. Fisher,
George Fisher,
by
Victor J. Evans
Attorney No. 766,028. Patented July 26, 1904.

UNITED STATES PATENT OFFICE.

FRANK M. FISHER AND GEORGE FISHER, OF LITTLE SIOUX, IOWA.

LANTERN ATTACHMENT FOR VEHICLES.

SPECIFICATION forming part of Letters Patent No. 766,028, dated July 26, 1904.

Application filed March 1, 1904. Serial No. 196,010. (No model.)

*To all whom it may concern:*

Be it known that we, FRANK M. FISHER and GEORGE FISHER, citizens of the United States, residing at Little Sioux, in the county of Harrison and State of Iowa, have invented new and useful Improvements in Lantern Attachments for Vehicles, of which the following is a specification.

This invention relates to lantern-holders for vehicles; and the primary object of the same is to provide a simple and effective attachment for application to the end of a wagon pole or shaft in advance of the draft animal or animals to assist in regularly following the roadway and avoiding accident and injury incident to the movement of a vehicle into holes or ditches. By arranging a lantern or analogous lighting device ahead of a draft animal or animals it is less liable to become splashed or spattered with mud, and, furthermore, the present attachment not only serves as a support or holder for a lantern, but also will be found exceptionally effective in retaining a neck-yoke in place on a pole.

The invention consists in the construction and arrangement of the several parts, which will be more fully hereinafter set forth.

The drawing illustrates a perspective view of the attachment shown applied to a portion of a pole in dotted lines and also having a lantern held thereby, also in dotted lines.

The holder consists of a horizontal forwardly-projecting U-shaped yoke provided with a transverse cross-bar 1, having opposite arms 2 bent at right angles therewith, with upwardly-directed rounded terminals bent at right angles therewith to form vertical extensions. From the center of the yoke a shank 4 projects rearwardly and connects with a ring 5, having a lower forwardly-projecting clamping-tongue 6 extending inwardly toward the cross-bar 1, in which a clamping-screw 7 is mounted. The shank 4, ring 5, and tongue 6 have such contour as to adapt them to the usual tapered construction of a pole or shaft extremity. From a standpoint of economic manufacture it is preferred that the holder be cast of one piece from suitable metal; but it is obvious that it might be made in several pieces, secured by riveting or otherwise, which would be an obvious equivalent in the construction and arrangement of the several parts.

When the holder is applied, the yoke projects in advance of the pole or thill end, and the lantern is held between the arms through the medium of suitable loops 8, secured to opposite parts of the lantern-frame and slipped over the rounded terminals 3. The loops 8 rest against the arms 2 at the angles of intersection of the latter with the extremities 3, and said extremities are long enough to prevent the latter from becoming accidentally detached during the movement of the vehicle. When the ring 5 has been applied to a pole in advance of a neck-yoke center, it will be effective in retaining the yoke in engagement with the pole irrespective of the breakage or detachment of parts of harness intimately related to the yoke. Furthermore, the attachment may be readily applied to the poles or shafts of different vehicles, and by arranging the yoke in horizontal position, with a clear space between the arms thereof, a lantern can be more readily applied thereto and preserved against breakage.

Changes in the proportions and dimensions may be resorted to without departing from the spirit of the invention.

Having thus fully described the invention, what is claimed as new is—

A lantern-holder comprising a horizontally forwardly projecting U-shaped yoke consisting of a transverse cross-bar provided with oppositely-arranged arms bent at right angles thereto, the arms at their outer ends being bent at right angles to form vertical extensions, a shank projecting laterally in a horizontal position from the central portion of the cross-bar and having on its outer end a ring provided with an inwardly-extended tongue arranged diametrically opposite the shank and having clamping means secured thereto, substantially as specified.

In testimony whereof we affix our signatures in presence of two witnesses.

FRANK M. FISHER.
GEORGE FISHER.

Witnesses:
STEVENSON A. CALDWELL,
W. H. EARNEST.